United States Patent
Lindoff et al.

(10) Patent No.: US 8,699,467 B2
(45) Date of Patent: Apr. 15, 2014

(54) ANCHOR CARRIER SELECTION IN MULTI-CARRIER WIRELESS NETWORK

(75) Inventors: Bengt Lindoff, Bjärred (SE); Stefan Parkvall, Stockholm (SE); Matthias Kamuf, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 422 days.

(21) Appl. No.: 12/934,427

(22) PCT Filed: Sep. 3, 2008

(86) PCT No.: PCT/SE2008/050992
§ 371 (c)(1),
(2), (4) Date: Jan. 18, 2011

(87) PCT Pub. No.: WO2009/120125
PCT Pub. Date: Oct. 1, 2009

(65) Prior Publication Data
US 2011/0142009 A1   Jun. 16, 2011

Related U.S. Application Data

(60) Provisional application No. 61/039,190, filed on Mar. 25, 2008.

(51) Int. Cl.
*H04W 4/00* (2009.01)
(52) U.S. Cl.
USPC .......................................... 370/332; 370/341
(58) Field of Classification Search
USPC ............................................... 370/329, 332
See application file for complete search history.

(56) References Cited

U.S. PATENT DOCUMENTS

| | | | | |
|---|---|---|---|---|
| 5,208,804 A * | 5/1993 | Wilson et al. | | 370/343 |
| 5,917,812 A * | 6/1999 | Antonio et al. | | 370/337 |
| 6,963,746 B2 * | 11/2005 | Sato et al. | | 455/450 |
| 8,432,859 B2 * | 4/2013 | Lee et al. | | 370/329 |
| 8,554,225 B2 * | 10/2013 | Kwon et al. | | 455/436 |

(Continued)

FOREIGN PATENT DOCUMENTS

WO   2006/125149   11/2006

OTHER PUBLICATIONS

Office Action in corresponding Indonesian Patent Application No. W-00 2010 03311 dated Jun. 14, 2012.

(Continued)

*Primary Examiner* — Warner Wong
(74) *Attorney, Agent, or Firm* — Nixon & Vanderhye P.C.

(57) ABSTRACT

Mechanism to receive control signals transmitted from a base station (210, 510, 910) to the user equipment (220, 520, 920) in a manner that minimizes power consumption on the user equipment (220, 520, 920) while still maintaining some acceptable level of performance is described. The user equipment (220, 520, 920) periodically measures the signal quality of component carriers used by the base station (210, 510, 910) and requests control signaling (anchor) carrier reselection. Either a single component carrier can be chosen if the single carrier has sufficient quality or multiple component carriers can be selected when the quality of the single quality is low. The anchor carrier reselection may also be triggered to manage the system as a whole. For fast moving user equipments (220, 520, 920), anchor carrier hopping pattern can be provided to increase robustness and reduce reselection signaling overhead.

26 Claims, 13 Drawing Sheets

(56) References Cited

U.S. PATENT DOCUMENTS

| | | |
|---|---|---|
| 2006/0193338 A1* | 8/2006 | Zheng et al. .................. 370/437 |
| 2006/0221809 A1 | 10/2006 | Malladi |
| 2006/0280142 A1* | 12/2006 | Damnjanovic et al. ....... 370/329 |
| 2007/0015476 A1* | 1/2007 | Akbar Attar et al. ...... 455/127.1 |
| 2010/0110988 A1* | 5/2010 | Marinier et al. .............. 370/328 |
| 2010/0234037 A1* | 9/2010 | Terry et al. .................... 455/450 |
| 2010/0238904 A1* | 9/2010 | Zhang et al. .................. 370/333 |
| 2011/0038399 A1* | 2/2011 | Bienas et al. ................. 375/135 |
| 2012/0044910 A1* | 2/2012 | Maeda et al. ................. 370/332 |

OTHER PUBLICATIONS

International Search Report for PCT/SE2008/050991, mailed Jan. 29, 2009.

"3GPP TR. 25.814 V1.2.0; $3^{rd}$ Generation Partnership Project; Technical Specification Group Radio Access Network; Physical Layer Aspects for Evolved Utra (Release 7)", Internet Citation, [online], http://www.3gpp.org/ftp/Specs/html-info/25814.htm> pp. 35-38, XP002400401.

International Preliminary Report on Patentability for PCT/SE2008/050991, completed Jun. 7, 2010.

* cited by examiner

ANCHOR CARRIER SELECTION IN MULTI-CARRIER WIRELESS NETWORK

This application is the U.S. national phase of International Application No. PCT/SE2008/050992, filed 3 Sep. 2008, which designated the U.S. and claims priority to U.S. Application No. 61/039,190, filed 25 Mar. 2008, which are hereby incorporated by reference.

TECHNICAL FIELD

The disclosed technology relates to selecting one or more anchor carriers for a user equipment in a wireless network.

BACKGROUND

Evolution of cellular systems promise significant data rate increase in the future, to 1 Gb/s and higher. Higher data rates typically require larger system bandwidths. For the IMT (International Mobile Telecommunications) advanced (i.e. the fourth generation mobile communication) systems, bandwidths up to 100 MHz are being discussed. Unfortunately, the radio spectrum is a limited resource and since many operators and systems need to share the same radio resource, finding a free 100 MHz contiguous spectrum is problematic.

One way to address this issue is to aggregate multiple narrow bandwidths (or component carriers) as illustrated in FIG. 1, which can be contiguous or non-contiguous to aggregately achieve the wide bandwidth. In the example of FIG. 1, a 50 MHz bandwidth spectrum is achieved by aggregating individual narrower bandwidth component carriers, which in this instance are 20 MHz, 20 MHz, and 10 MHz wide carriers. One benefit of such a solution is that it is possible to generate sufficiently large bandwidth for supporting data rates up to and above 1 Gb/s. Furthermore, this solution also makes it possible to adapt the spectrum parts to various situations and geographical positions thus making such solution very flexible.

A straightforward evolution of current cellular systems, such as LTE (Long Term Evolution), to support contiguous and non-contiguous spectrum is to introduce multi-carriers. That is, for each spectrum "chunk" representing a "legacy LTE" system carrier, a "4G" user equipment can be made to be capable of receiving multiple number of LTE component carriers of different bandwidths transmitted at different carrier frequencies.

A user equipment needs to listen for layer 1 and 2 (L1, L2) control signals to know where (in frequency or subchannels) and/or when (in time) data packets are scheduled to the user equipment. In single bandwidth systems like the GSM and LTE, the control signals are signaled from a serving base station on a single carrier frequency of the serving cell.

The control signaling of the single bandwidth systems can be extended to the multi-carrier scenario. That is, the user equipment can listen to the entirety of the aggregated spectrum for the control signals. Although this approach seems to be straightforward, there can be a significant drawback in terms of the user equipment power consumption. The aggregated spectrum approach, especially the non-contiguous spectrum case, implies that the radio receiver architecture for the user equipment will become more complicated than for a user equipment that is capable of only receiving small and contiguous system bandwidths. The reason is that the front end radio needs to be able to suppress blocking signal in between the spectrum "chunks". Different kind of radio architecture can be used to handle this problem. However, they typically accompany drawbacks in terms of power consumption compared to standard continuous system bandwidth receivers.

SUMMARY

One aspect of the invention is to provide a mechanism so that control signals transmitted from the base station are received by the user equipment in a manner that minimizes power consumption on the user equipment while still maintaining some acceptable level of reliability and/or performance. To achieve this balance, a minimum amount receiver capacity on the user equipment can be activated that will achieve the acceptable reliability and/or performance.

In the best scenario, a single component carrier will be sufficient for the user equipment. The user equipment can then use the single component carrier as the anchor carrier and put any remaining receiver capacity in a power conservations mode. The anchor carriers carry control signals from the base station to the user equipment.

In less than optimal conditions, the user equipment only turns on as much capacity as needed to maintain the acceptable level of performance. For example, if the user equipment includes a plurality of receivers each adapted to listen on different narrow bandwidth component carriers, multiple receivers may be turned on to listen for control signals on multiple anchor carriers. As another example, if the user equipment includes one or more adaptable bandwidth receivers, the frequency range of the receiver or receivers may be adjusted to listen on the multiple anchor carriers.

The user equipment can periodically—rather than continuously—monitor the carriers from the base station. The periodic monitoring helps to reduce power consumption on the user equipment since the receivers for those carriers are not on continuously. When a triggering event occurs, the user equipment can request a selection (change) of anchor carrier(s) to the base station.

In an embodiment, the triggering event generally occurs when at least one of the current non-anchor carriers is better than at least one of the current anchor carriers. When the triggering event occurs, a change occurs so that the current non-anchor carrier becomes one of the new anchor carriers for the user equipment. If the current non-anchor carrier is sufficient by itself, then it can be the sole anchor carrier. This allows all other receivers of the user equipment to be put into the power conservation mode, such as being turned off a majority of time and only being turned on for periodic monitoring.

Note that minimizing the number of anchor carriers for the user equipment also has the benefit of enhancing system capacity since less resources (less number of carriers) have to be devoted to the user equipment.

These concepts can be extended to multiple base stations. For example, the user equipment can request switching of anchor carrier(s) not only to carriers from a single base station, but also to carrier(s) from another base station. That is, soft or softer handover can be requested.

In other aspects, the base station itself can initiate switching of anchor carriers for load management purposes. Also, carrier hopping can be implemented, which is a defined sequence of anchor carrier(s) changes over time for a user equipment. The carrier hopping can be especially useful for fast moving user equipments.

Advantages of the embodiments include at least the following. By introducing an anchor carrier set selection procedure as described above and detailed below, the user equipment—in many cases—can camp on a single component carrier for decoding the control signaling. This helps to reduce the current consumption considerably in the radio front end. Also, the user equipment can also select multiple component carriers for control signaling, either from a single cell or multiple cells, if that is needed for the current radio channel scenario. This provides improved control signaling robustness. Further, by implementing carrier set hopping, robust control signaling for fast moving user equipments is achieved while reducing signaling overhead. Yet further, by allowing anchor carrier set updates, load on the network can be managed efficiently.

DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

Figure 1:
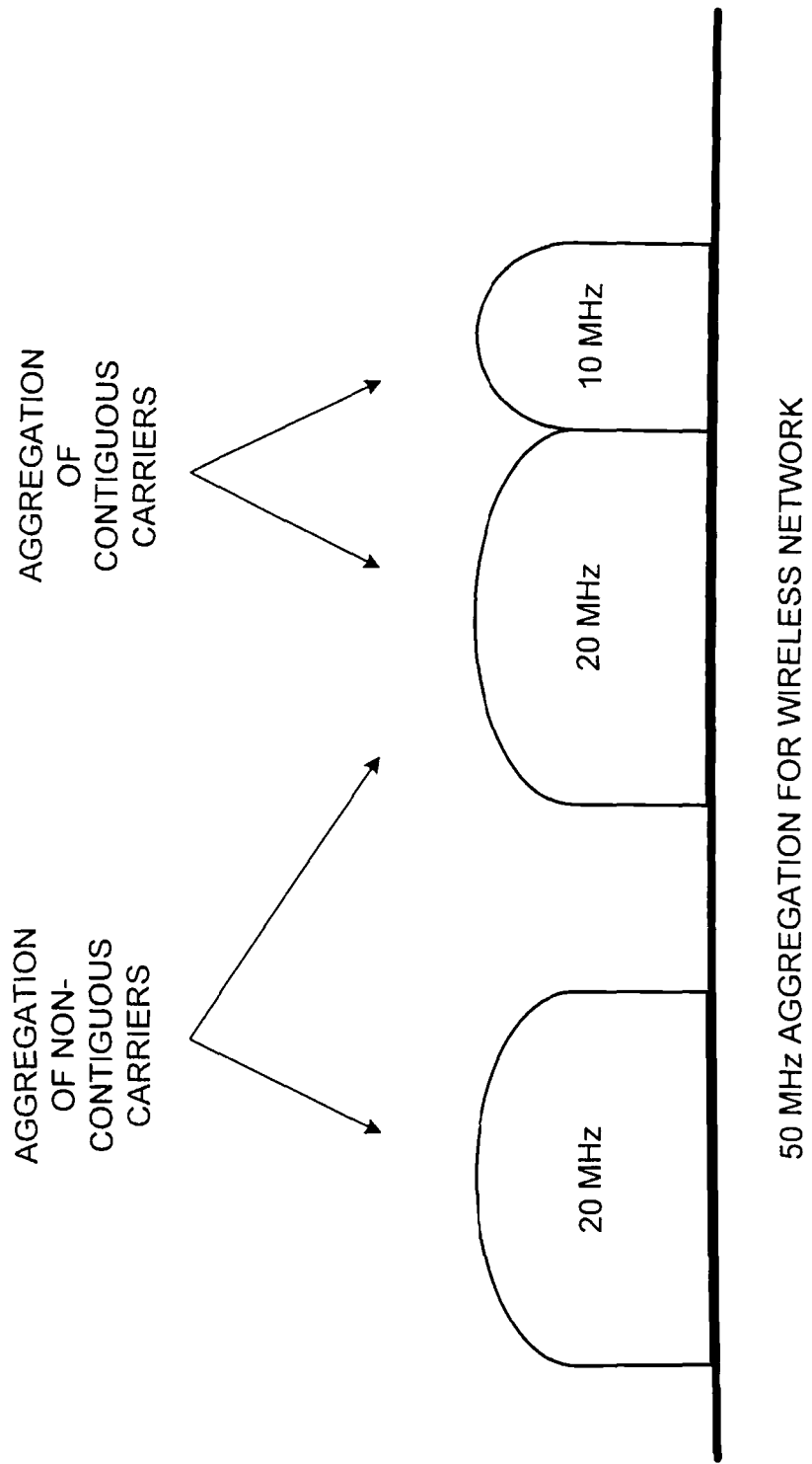
FIG. 1 illustrates an example aggregation of multiple narrow bandwidth carriers to an aggregated wide bandwidth carrier.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope.

In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

In an embodiment, a L1/L2 control signaling component carrier or carriers reselection procedure is introduced. This can be accomplished in several ways. In one way, the user equipment can measure, on a regular basis (i.e., periodically), a reliability of a signal on respective component carriers of the aggregated bandwidth spectrum. The signal reliability can be measured in terms of SIR (signal-to-interference ratio), RSRP (reference signal received power), data transmission rate, error rate, repeat request rate, and so on. In general, any QoS (quality of service) measurement parameters may be used for reliability.

Based on the reliability of the component carriers, the user equipment can request an anchor carrier reselection to the base station. That is, the user equipment can request a change in the anchor carrier set—which is a set of carriers that include one or more anchor carriers for the user equipment. An anchor carrier can be viewed as the carrier that carries the control signals, such as the L1/L2 control signals, from the base station to the user equipment. The control signals inform the user equipment regarding specific downlink and uplink resources (such as identification of resource blocks of a component carrier) scheduled for the user equipment, modulation scheme to be used, transmission power level, and so on.

In the anchor carrier reselection, a single component carrier can be chosen or multiple component carriers may be selected to be included in the anchor carrier set. For example, a single component carrier may have sufficient SIR from the perspective of the user equipment and thus can be chosen to be the single anchor carrier in the set. If the single component carrier does not have the sufficient SIR, then multiple carriers can be selected to be included in the anchor carrier set to achieve the desired SIR.

The anchor carrier selection process may be initiated also for load management purposes. Typically, a base station is in communication with multiple user equipments and one component carrier can be used by the base station to transmit control signals to multiple user equipments. The same component carrier can be used to carry data signals as well. In these instances, some component carriers may be overutilized and other component carriers may be underutilized. To alleviate this problem, different anchor carriers can be selected for different user equipments to distribute the load. Also, the anchor carrier set for the different user equipments may be changed dynamically.

When the anchor carrier selection process completes, the number of anchor carriers for the user equipment will typically change, preferably to a lower number than there was before the change.

In another way, a control signaling hopping pattern, i.e. an anchor carrier hopping pattern, can be provided to the user equipment. The anchor carrier hopping pattern defines a sequence over time of anchor carrier or carriers selected for the user equipment. The sequence can be at regular intervals such as at every subframe (1 ms), at every super frame (10 ms), and so on. By introducing hopping robustness to frequency and time selective fading is introduced and the reselection signaling overhead is reduced.

Figure 2:
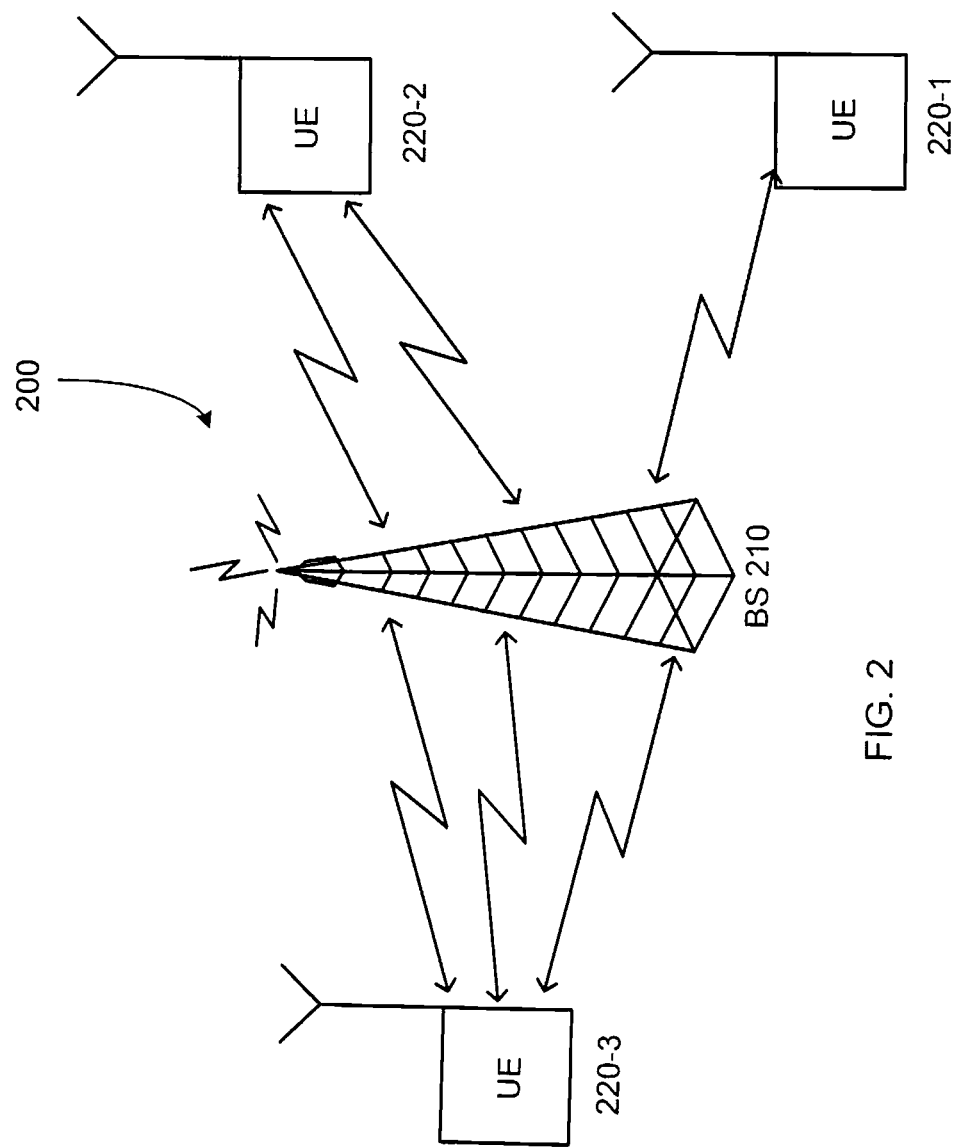
FIG. 2 illustrates an embodiment of a wireless network in which anchor carrier(s) for user equipment(s) is(are) selected.

FIG. 2 illustrates an embodiment of a wireless network 200, which includes a base station 210 wirelessly communicating with user equipments 220-1, 220-2, and 220-3. The base station 210 is also sometimes referred to as a Node B or eNB and examples of user equipments 220 include a cellular phone, portable digital assistants (PDA) and mobile terminals.

The bidirectional zigzag arrowed lines from the base station 210 to the user equipments 220 each represent a component carrier of an aggregated wide bandwidth spectrum (see FIG. 1) used as anchor carriers. In FIG. 2, a single anchor carrier is in the anchor carrier set for the user equipment 220-1, two anchor carriers are included in the anchor carrier set for the user equipment 220-2, and three anchor carriers are included in the anchor carrier set for the user equipment 220-3.

Note that the user equipments 220 can share a common component carrier as the anchor carrier. For example, one of the anchor carriers for the user equipment 220-2 may be the same component carrier used as the anchor carrier for the user equipment 220-1.

In FIG. 2, it is assumed that the base station 210 is capable of transmitting and the user equipments 220 are capable of receiving a plurality of component carriers where each component carrier is associated with a bandwidth. That is, the wireless network 200 can be a multi carrier system such as a multi carrier LTE or GSM, WCDMA, and so on. The plurality of carriers can be such that there is at least one gap in the aggregated frequency spectrum represented by the plurality of carriers as illustrated in FIG. 1.

Figure 3:
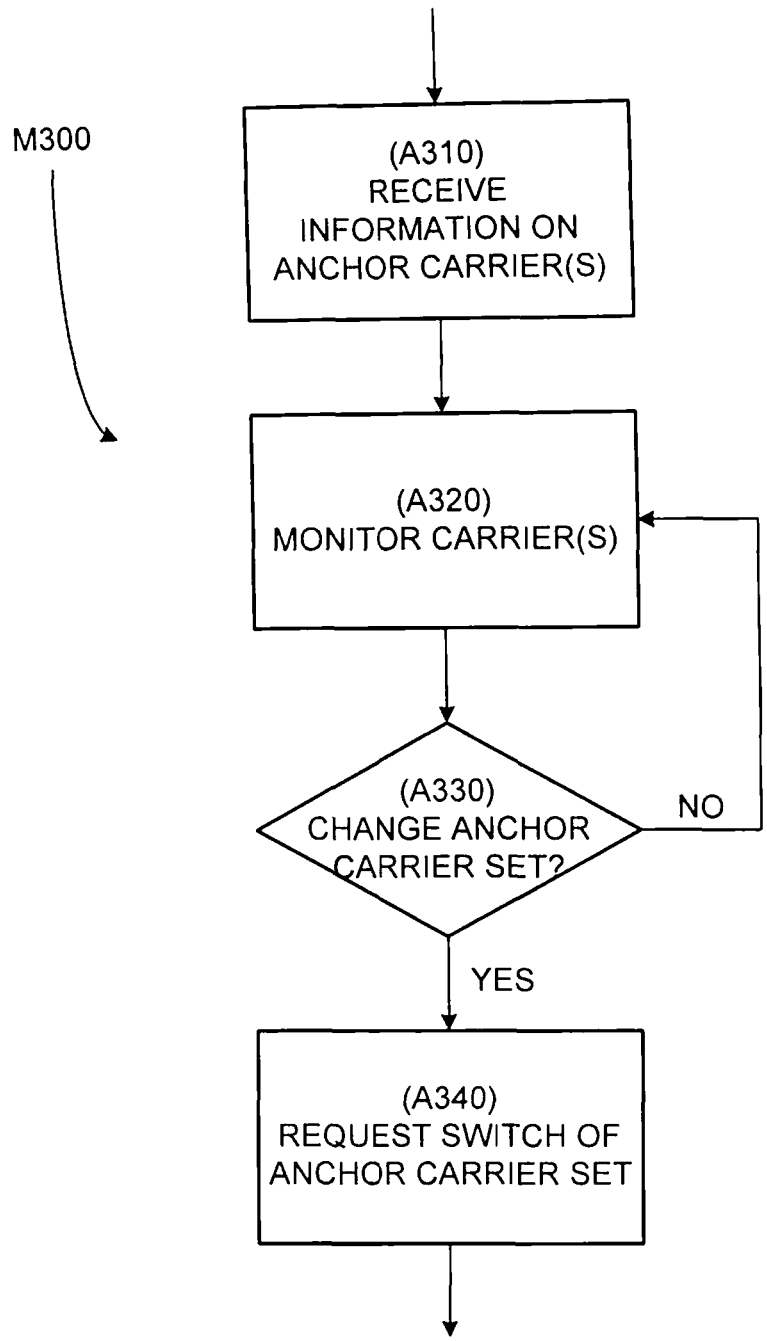
FIG. 3 illustrates an example method to select anchor carrier(s) for a user equipment.

FIG. 3 illustrates an example method M300 to select one or more anchor carriers for the user equipment 220 from the perspective of the user equipment 220. In the method, the user equipment 220 receives information on the component carriers from the base station 210 that can potentially be selected as the anchor carriers. For example, when the user equipment 220 first connects to the base station 210, the base station 210 may broadcast the information. At this point, it can be assumed that at least one component carrier is used as the anchor carrier for the user equipment 220. In one example, a default carrier may be assigned as the anchor carrier for the user equipment 220 upon initial connection with the base station 210.

Then in A320, the user equipment 220 monitors the signals transmitted over one or more of the plurality of component carriers from the base station 210. It is preferred that the monitoring of the carriers be performed periodically, such as every 50-100 ms. In this manner, power consumption is minimized.

In A330, the user equipment 220 makes a determination as to whether the anchor carrier set should be changed. An anchor carrier set is defined as a set of carriers that includes one or more anchor carriers used by the user equipment 220 to receive control signals transmitted from the base station 210. The user equipment 220 makes the determination based on the monitoring performed in A320, i.e., it is determined whether the triggering event has occurred.

In one embodiment, the user equipment 220 determines that the anchor carrier set should be changed when a reliability of a non-anchor component carrier (a carrier currently not in the anchor carrier set) is greater than a reliability of an anchor carrier (a carrier currently in the anchor carrier set). Note that the reliability comparison is made from the perspective of the user equipment 220.

Reliability may be determined based on signal-to-interference ratio (SIR), reference signal received power (RSRP), a data transmission rate, an error rate, a repeat request rate, etc. of each carrier. That is, between a first carrier currently not in the anchor carrier set and a second carrier current in the anchor carrier set, the first carrier can be determined to be more reliable than the second carrier when the SIR of the first carrier is higher than the second carrier, the RSRP of the first carrier is higher than the second carrier, the data transmission rate of the first carrier is greater than the second carrier, and the error rate of the first carrier is lower than that of the second carrier. Also, the repeat request rate of the first carrier could be lower than that of the second carrier, for example, the HARQ (hybrid automatic repeat request) rate of the first carrier can be lower than that of the second carrier. In general, QoS (quality of service) parameters can be used for the reliability measurement.

If the user equipment 220 determines that the anchor carrier set should be changed in A330, then the user equipment 220 can make a request to the base station 210 to change the anchor carrier set in A340. Otherwise, the user equipment 220 can go back to monitor the carriers in A320.

Figure 4:
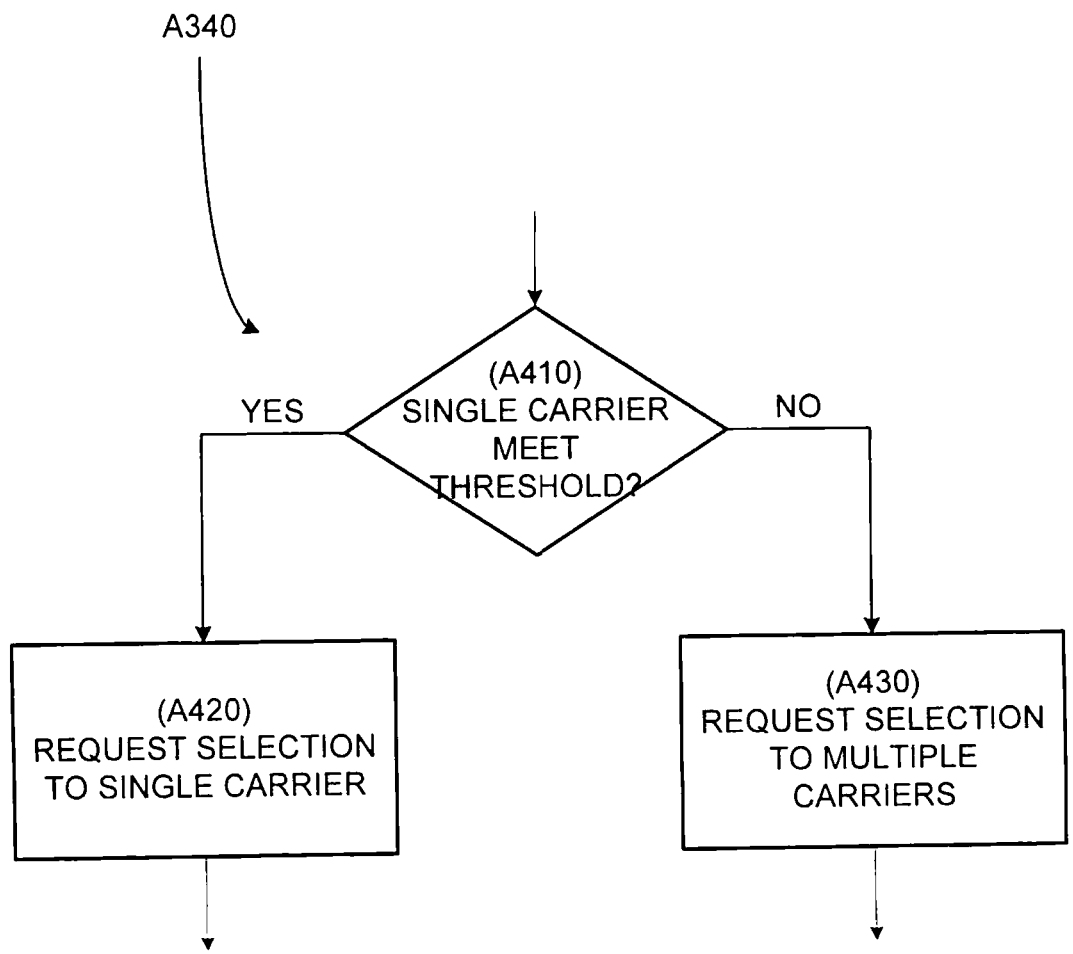
FIG. 4 illustrates an example method to request switching of anchor carrier(s)

FIG. 4 illustrates an example method to perform A340 of FIG. 3. In FIG. 4, the user equipment 220 determines whether the first carrier, i.e., the current non-anchor carrier, meets a predetermined minimum reliability threshold in A410. That is, the user equipment 220 determines whether the first carrier is sufficient on its own to serve as the sole anchor carrier. If the first carrier meets the predetermined minimum reliability threshold, then in A420, the user equipment 220 makes a request to the base station 210 to include only the first carrier in the anchor carrier set. This allows the receivers of the user equipment 220 configured to listen on other component carriers to be put into a power conservation mode. Examples of power conservation modes include turning off the receiver, turning on a DRX (discontinuous reception) mode for the receiver, narrowing the frequency of the receiver (in case of adaptable bandwidth receiver), and so on.

On the other hand, if the first carrier does not meet the predetermined minimum reliability threshold in A410, then the user equipment 220 makes a request to the base station 210 to include multiple carriers into the anchor carrier set in A430 which can include the first carrier. Here, the multiple carriers can be chosen from the plurality of carriers to which the user equipment 220 is capable of listening so as to minimize the number of anchor carriers in the anchor carrier set necessary to meet the predetermined minimum reliability threshold. The predetermined reliability threshold may be based on the reliability parameters such as the parameters discussed above.

Figure 5:
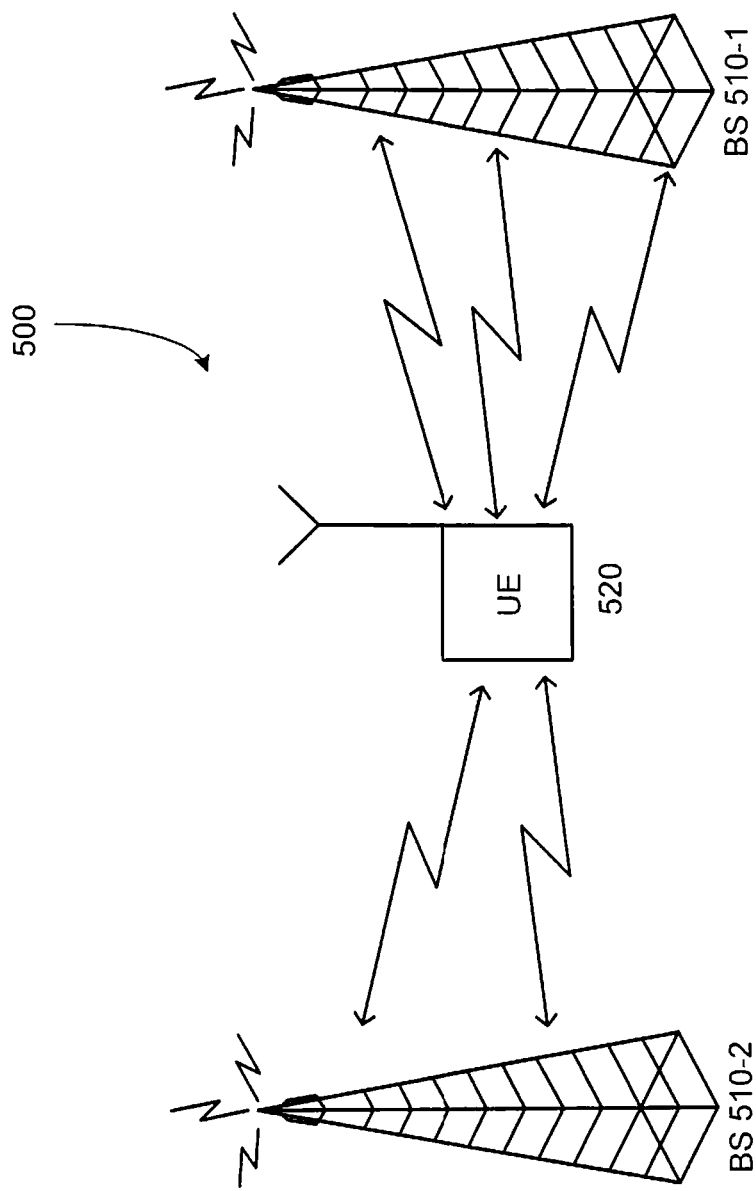
FIG. 5 illustrates another embodiment of a wireless network in which anchor carrier(s) for user equipment(s) is(are) selected.

In FIG. 2, the user equipment 220 receives control signals from a single base station 210. That is, the anchor carriers are all from the same base station 210. However, it is possible to include multiple base stations. In an embodiment illustrated in FIG. 5, the anchor carrier set for the user equipment 520 can include component carriers from different base stations 510-1 and 510-2. In this instance, the user equipment 520 can monitor the signals carried on component carriers used by both base stations 510. In FIG. 5, one of the base stations 510, such as the base station 510-1, is assumed to be the serving base station 510 for the user equipment 520.

Figure 6:
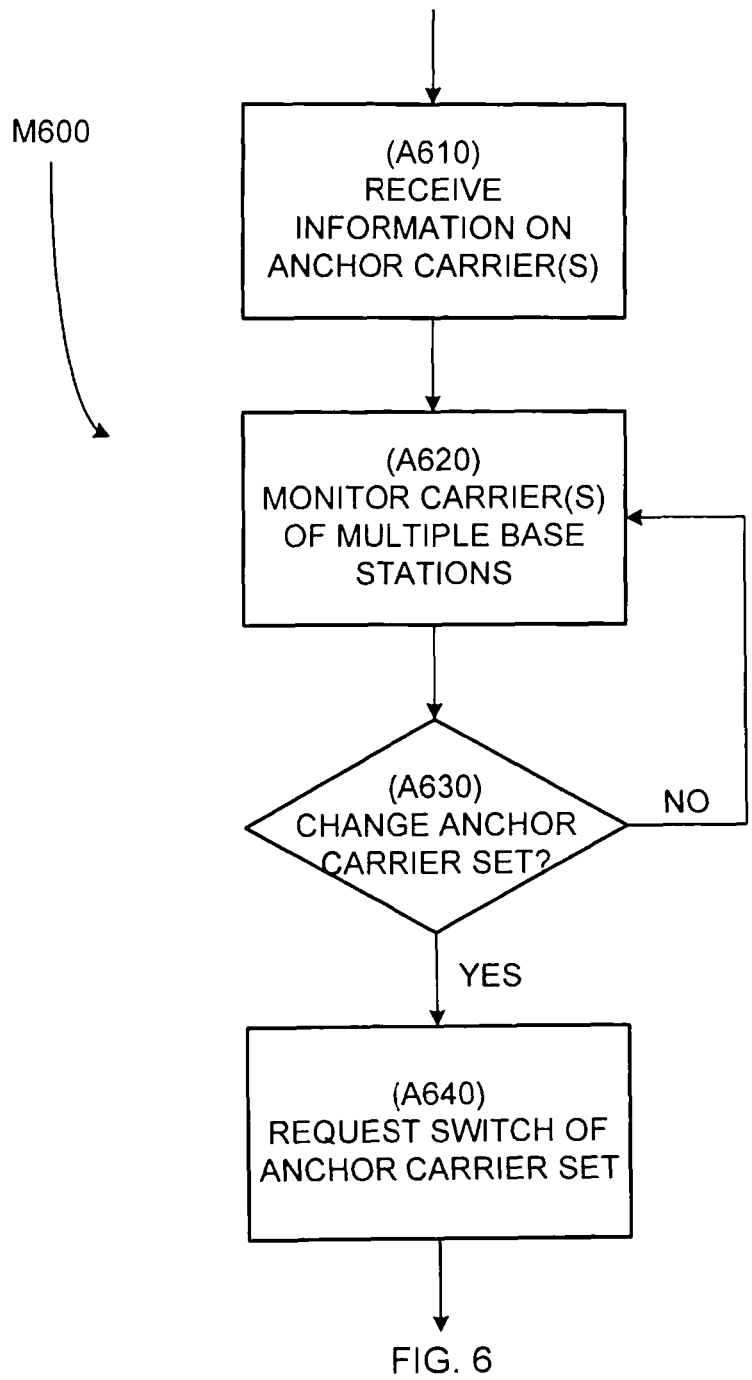
FIG. 6 illustrates an example method to select anchor carrier(s) from multiple base stations for a user equipment.

FIG. 6 illustrates an example method M600 to select anchor carriers for the user equipment when there are multiple base stations. In the method, the user equipment 520 can receive information of component carriers that can be used as anchor carriers in A610. In this situation, the user equipment 520 receives information on component carriers of multiple base stations 510.

In A620, the user equipment 520 monitors the component carriers of the respective base stations 510. Based on the monitoring, the user equipment 520 makes a determination on whether the anchor carrier set should be changed in A630, i.e., determines whether the triggering event has occurred. If the user equipment 520 makes such determination, then the user equipment 520 makes a request to switch the anchor carrier set in A640. Otherwise, the user equipment 520 goes back to monitoring the carriers in A620. Note that A610, A620, and A630 in FIG. 6 are similar to A310, A320 and A330 in FIG. 3, respectively. The difference is that component carriers of multiple base stations 510 are considered in FIG. 6.

Figure 7:
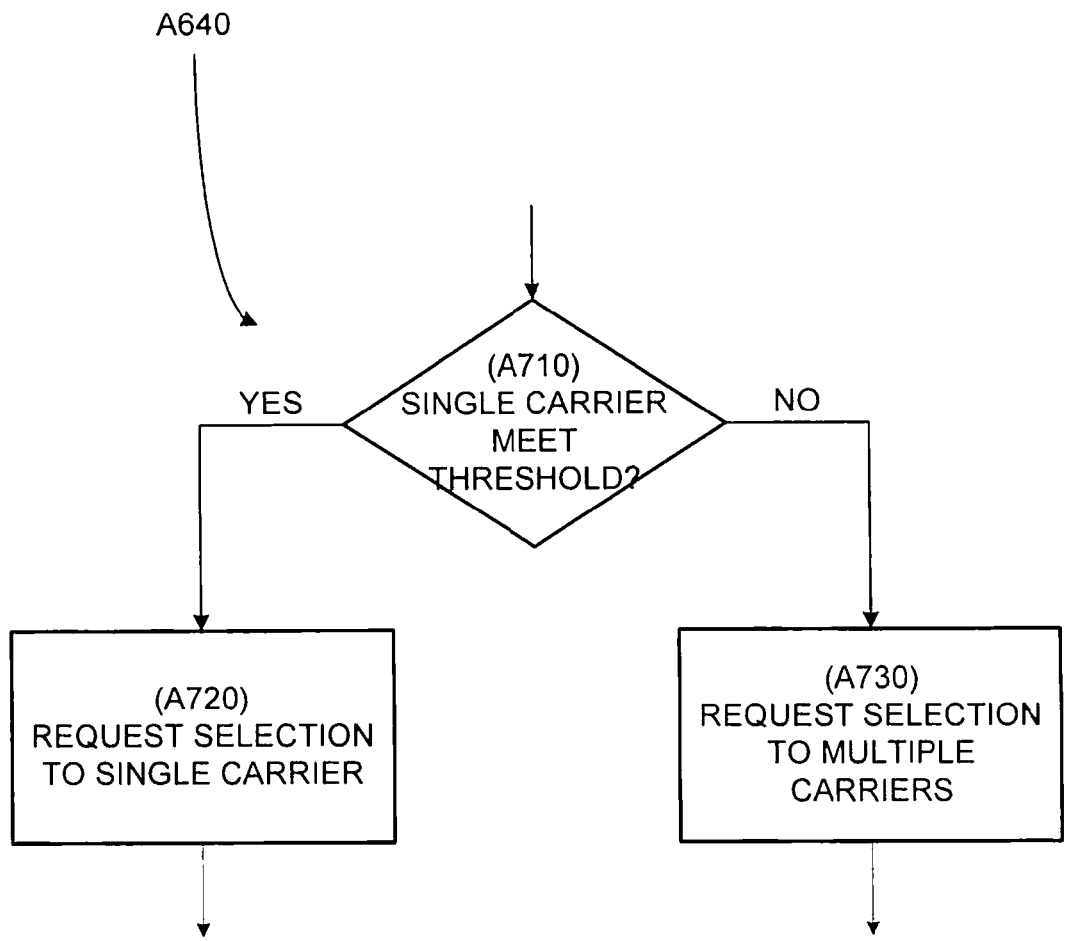
FIG. 7 illustrates an example method to request switching of anchor carrier(s) from multiple base stations.

FIG. 7 illustrates an example method to perform A640 of FIG. 6. In FIG. 7, the user equipment 520 determines whether the first carrier meets the predetermined minimum reliability threshold in A710. If so, then the user equipment 520 makes a request to include only the first carrier in the anchor carrier set in A720. Otherwise, in A730, the user equipment 520 makes a request to include multiple carriers in the anchor carrier set. Again, the multiple carriers are chosen to minimize the number of carriers to meet the predetermined minimum reliability threshold. Note that the multiple carriers need not be all from a single base station. Carriers from multiple base stations 510 can be selected to meet the predetermined minimum reliability threshold while minimizing the number of carriers selected.

Figure 8:
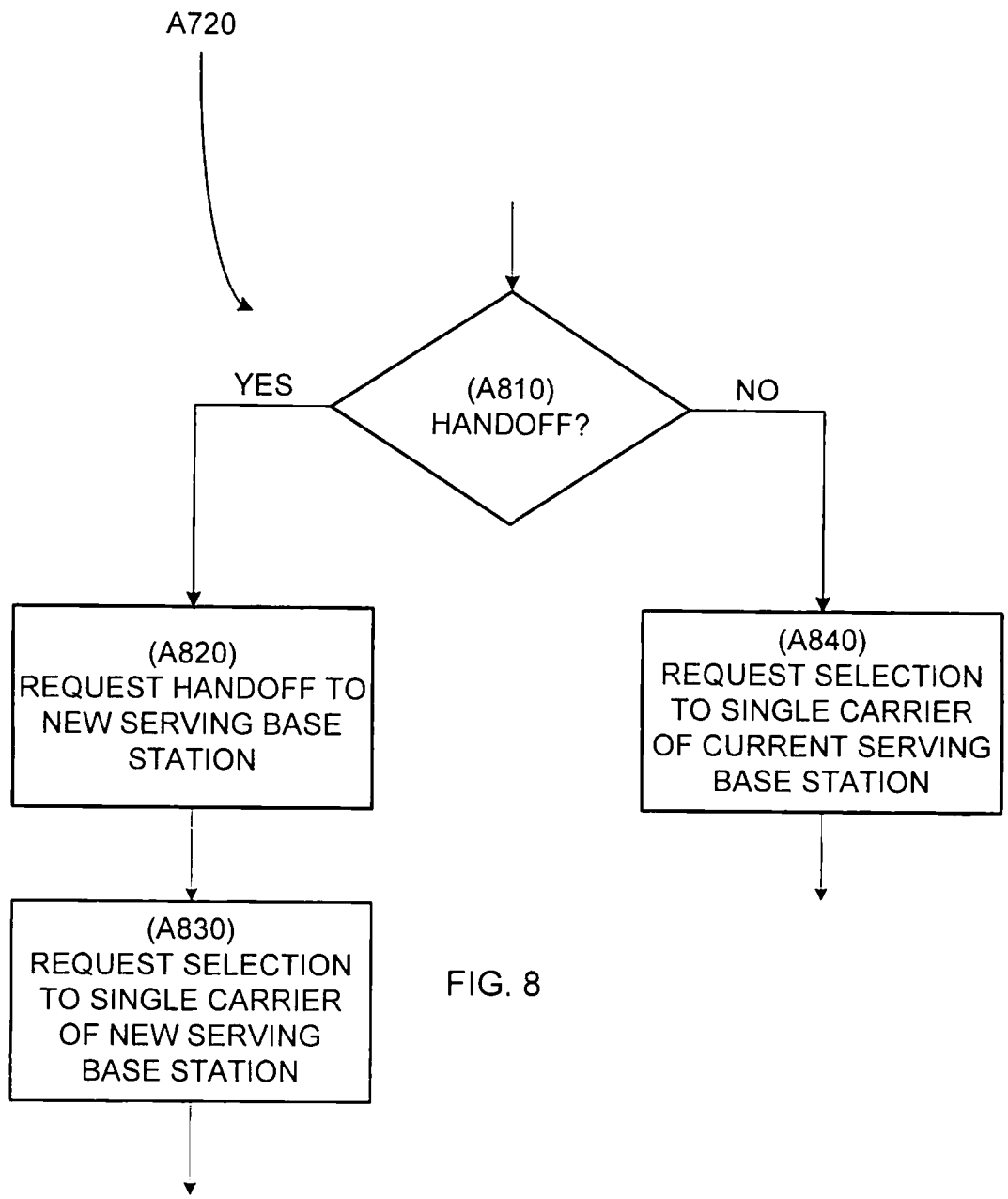
FIG. 8 illustrates an example method facilitate a possible handoff of a user equipment from one base station to another.

FIG. 8 illustrates a method to perform A720 of FIG. 7 in the multiple base station environment. Here, the user equipment 520 has determined that the first carrier is sufficient on its own. Thus, if the first carrier is not from the current serving base station 510-1, then a handoff is required.

In A810, the user equipment 520 determines whether a handoff is necessary. That is, it is determined whether the first carrier is from a base station that is not the current serving base station. If such determination is made, then in A820, the user equipment 520 makes a request to the current serving base station 510-1 to be handed off to the new serving base station 510-2. Once the handoff is completed, then in A830, the user equipment 520 makes a request to the new serving base station 510-2 to include only the first carrier in the anchor carrier set. If the handoff is not required, then in A840, the user equipment 520 makes a request to include only first carrier to be in the anchor carrier set to the current serving base station 510-1.

As noted previously, one advantage of minimizing the number of anchor carriers is that power of the user equipment may be conserved. For example, the user equipment may include a plurality of fixed narrow bandwidth receivers each configured to receive signals on particular component carriers. By minimizing the number of anchor carriers, the receivers that do not correspond to the anchor carriers can be put in power conservation mode. The power conservation mode can include any one or more of turning off the receiver, putting the receiver in a periodic monitoring mode, enabling a DRX (discontinuous reception) mode, and so on.

In another example, the user equipment may include one or more adaptable bandwidth receivers where the frequency range of each receiver can be dynamically adapted. Here, a receiving frequency range of the receivers can be narrowed to exclude non-anchor carriers for power conservation. Of course, the user equipment can include both fixed and adaptable bandwidth receivers.

Figure 9:
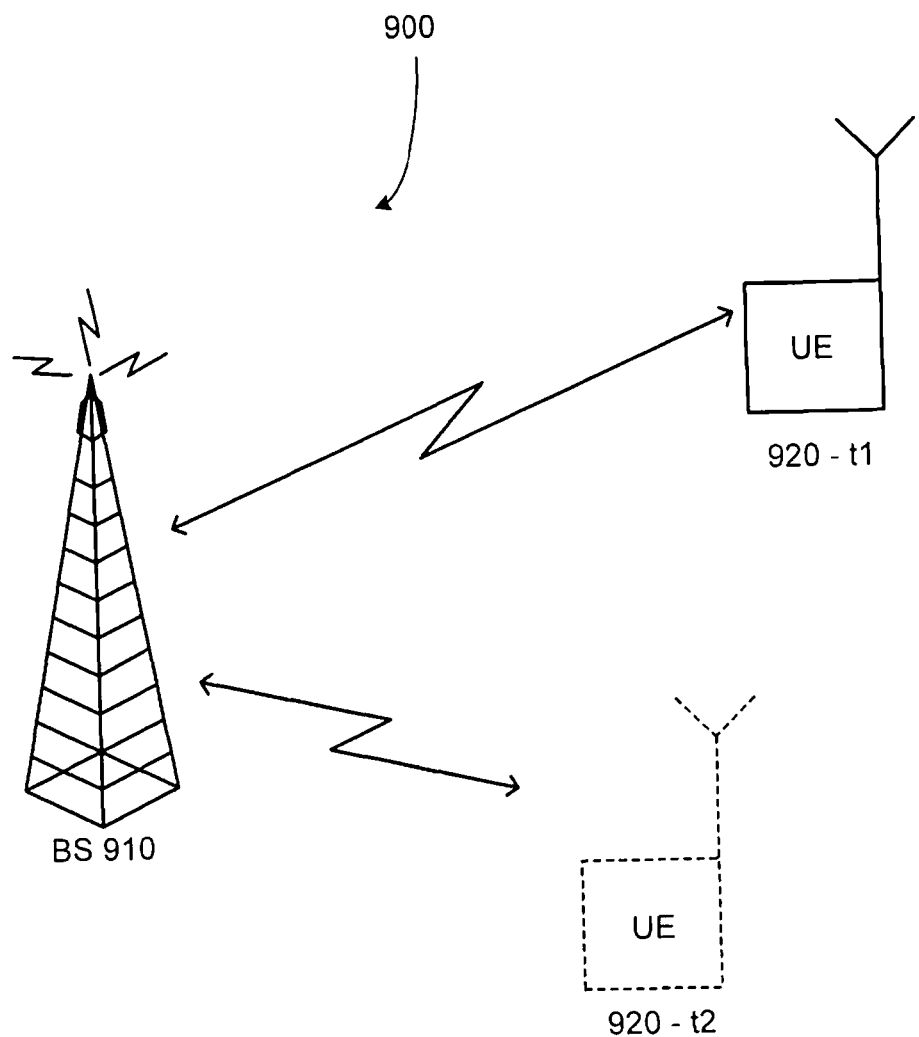
FIG. 9 illustrates another embodiment of a wireless network which facilitates carrier-hopping.

The embodiments illustrated in FIGS. 1-8 can work very well for a user equipment that is either stationary or slow moving. In the slow moving situation, the quality/reliability of the component carriers are unlikely to change from the perspective of the user equipment. However, for a fast moving user equipment, the situation can be very different, as illustrated in FIG. 9. As illustrated, the user equipment 920 is at significantly different positions at time t1 and at time t2. The anchor carrier set that was sufficient at time t1 may not be sufficient at time t2, and the anchor carrier set would need to be changed for the user equipment 920 at time t2. If the user equipment 920 is very fast moving, the anchor carrier set would be changed frequently.

Even under the fast moving user equipment scenario, the methods outlined in FIGS. 2-8 can be used with good results. However, it may be more resource efficient to anticipate the need for frequent anchor carrier set changes and to provide the information to the user equipment 920 in advance. In one embodiment, an anchor hopping pattern provided to the user equipment 920. The anchor hopping pattern specifies a sequence over time of one or more anchor carriers to be used by the user equipment 920 to receive the control signals transmitted by the base station 910.

The hopping pattern can be user equipment specific and be based on the identification of the user equipment 920. The hopping pattern can also be cell specific based on some cell specific hopping pattern. The hopping pattern could be such that the user equipment listens on a control channel on a particular component carrier for a superframe (10 ms long in LTE) and then jump to another component carrier or carriers. Then the user equipment 920 can receive the message and detect the control signals on the component carrier(s) according to the hopping pattern. An advantage of applying the anchor carrier hopping pattern is that it introduces robustness to the frequency and/or time selective fading, and at the same time, reduces the anchor carrier reselection signaling overhead associated with the methods illustrated in FIGS. 2-8.

Figure 10:
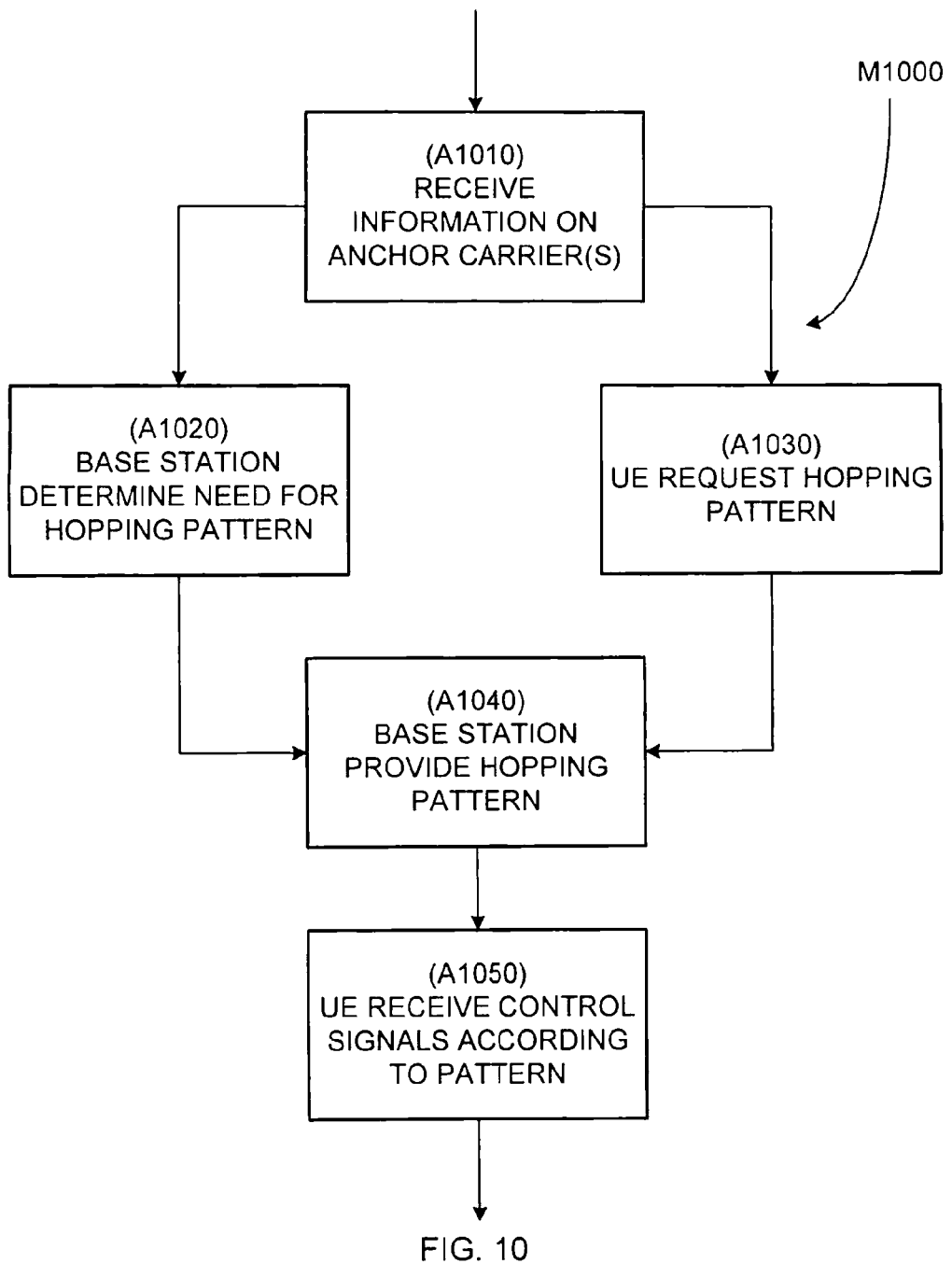
FIG. 10 illustrates an example method to facilitate carrier-hopping.

FIG. 10 illustrates an example method M1000 to implement the carrier hopping process described above. In A1010, the user equipment 920 receives information regarding the component carriers from the base station 910.

The hopping pattern may be provided because the base station 910 determines that there is a need for the hopping pattern. For example, the base station 910 can determine that the hopping pattern is needed in A1020 because the user equipment 920 is moving at a speed greater than a predetermined minimum rate. In one embodiment, a strength of the uplink transmission from the user equipment 920 can be measured by the base station 910 over time to determine the speed of movement of the user equipment 920.

The hopping pattern may also be provided because the user equipment 920 determines the need. In A1030, the user equipment 920 itself can determine that it is moving at a rate greater than the predetermined minimum rate, and thus, makes a request for the hopping pattern. For example, the user equipment 920 may include a location detection unit such a GPS unit.

When the need for the hopping pattern is determined in A1020 or the request for hopping pattern is made by the user equipment in A1030, then the base station 920 provides the hopping pattern to the user equipment 910 in A1040. Then in A1050, the user equipment 920 adapts the receivers to receive the control signals transmitted from the base station 910 by sequencing through the anchor carriers according to the anchor carrier hopping pattern.

In the example methods and embodiments discussed above, the selection of the anchor carriers in the anchor carrier set is based on considerations regarding the user equipment. However, the composition of the anchor carrier set for a user equipment may also be based on the consideration of the network as a whole. For example, there may be a capacity issue in the network. Over time, some component carriers may be overutilized and other component carriers may be underutilized. The overutilization can stem from not only transmitting control signals to the user equipments, but also from using the carrier to carry data between the base stations and the user equipments.

Figure 11:
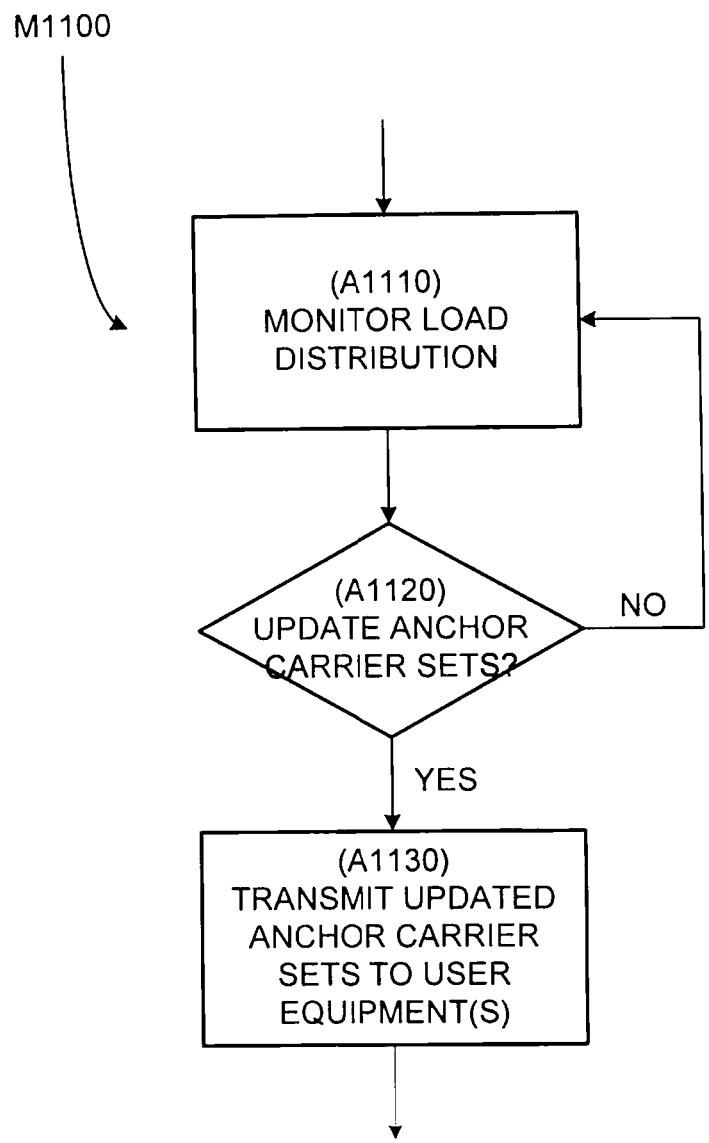
FIG. 11 illustrates an example method for load management.

FIG. 11 illustrates a method to redistribute anchor carriers, i.e., update anchor carrier sets, for load management. In FIG. 11, the base station monitors, in A1110, the load on each of the plurality of component carriers it uses for communication with the user equipments. Based on the monitoring, the base station determines whether anchor carrier sets should be updated to the user equipments in A1120. If such determination is made, then in A1130, the base station notifies one or more user equipments to switch anchor carriers, i.e., to update the anchor carrier set. That is, the base station informs the user equipments on which component carrier or carriers the control signals for that particular user equipment will be transmitted on. Afterwards, the base station transmits the control signals accordingly.

There can be a host of reasons to initiate updates of the anchor carrier sets. For example, the SIR of an anchor carrier used by one of the user equipments may fall below the predetermined minimum SIR threshold. Other reasons include: an error rate of data carried over an anchor carrier passes over a predetermined error rate threshold; a repeat request rate of data transmitted over an anchor carrier falls below a predetermined repeat request rate threshold; a number of user equipments being served by the base station over one carrier is greater than a number of user equipments being served by the base station over another carrier by at least a predetermined number; an amount of data transmitted over one carrier is greater than an amount of data transmitted over another carrier by at least a predetermined amount; and so on.

Figure 12:
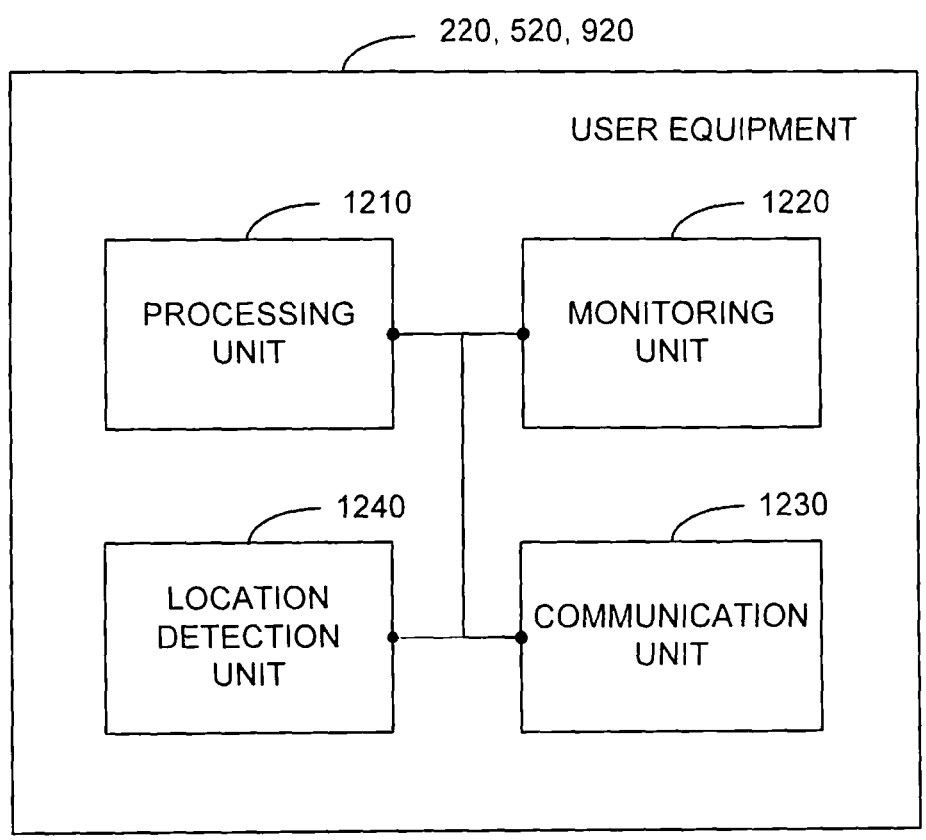
FIG. 12 illustrates an embodiment of a user equipment.

FIG. 12 illustrates an embodiment of the user equipment 220, 520 and 920, which includes a processing unit 1210, a monitoring unit 1220, a communication unit 1230 and a location detection unit 1240. The monitoring unit 1220 can, e.g., monitor the quality of the signals on carriers transmitted by the base stations 210, 510, 910 and the location unit 1240, such as the GPS unit, can determine the present location of the user equipment 220, 520, 920 as well as determining the rate of movement.

The communication unit 1230 is arranged to communicate with the base stations 210, 510, 910 and can include any combination of fixed bandwidth receivers and adaptable bandwidth receivers. If only fixed bandwidth receivers are considered, then the communications unit 1230 is preferred to include a plurality of receivers, where each receiver is configured to listen on one of the plurality of component carriers. If only adaptable bandwidth receivers are considered, then there can be one or more of these receivers. If a combination is considered, then there can be one or more fixed bandwidth receivers and one or more adaptable bandwidth receivers.

The processing unit 1210 is arranged to control the operations of the components of the user equipment 220, 520, 920 including the monitoring unit 1220, the communication unit 1230 and the location unit 1240 to perform the methods described above.

Figure 13:
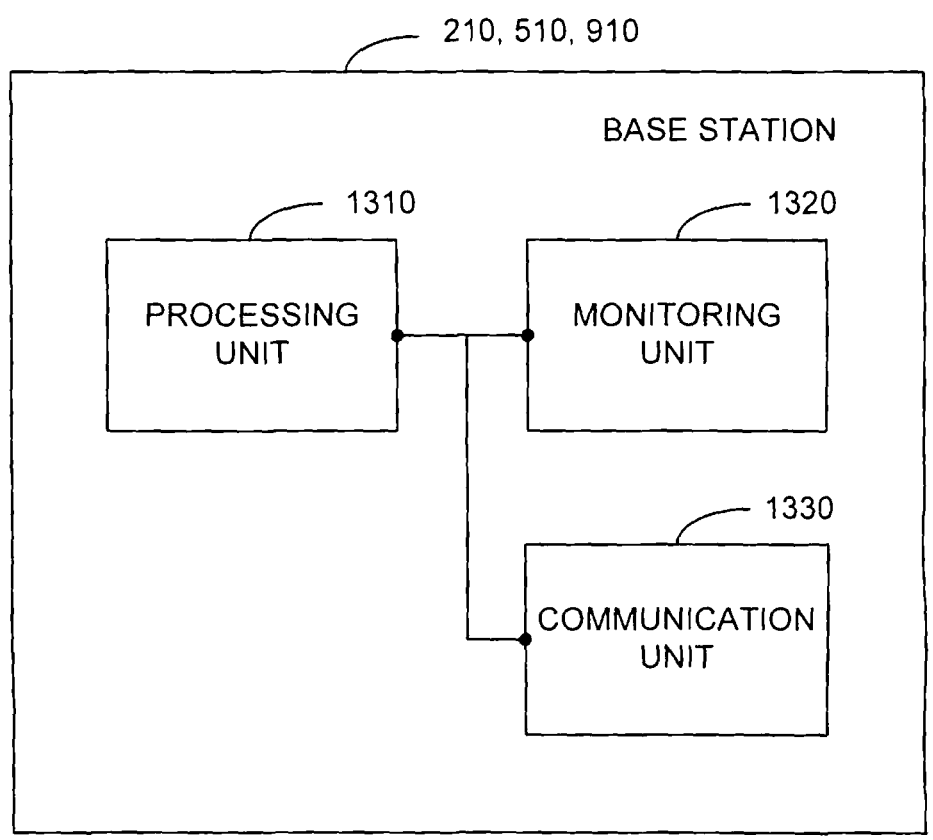
FIG. 13 illustrates an embodiment of a base station.

FIG. 13 illustrates an embodiment of a base station 210, 510, 910 as illustrated in FIGS. 2, 5 and 9. The base station 210, 510, 910 includes a processing unit 1310, a monitoring unit 1320 and a communication unit 1330. The monitoring unit 1320 is arranged to monitor, e.g., the load on the component carriers used by the base station 210, 510, 910. The communication unit 1330 is arranged to communicate with the user equipments 220, 520, 920 in the network. The processing unit 1310 is arranged to control the operations of the components of the base station 210, 510, 910 including the monitoring unit 1320 and the communication unit 1330 to perform the methods as described above.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby. Furthermore, no element, component, or method act in the present disclosure is intended to be dedicated to the public.

What is claimed is:

1. A method for operating a user equipment of a wireless network, comprising:

making a determination as to whether an anchor carrier set should be changed, wherein the anchor carrier set includes one or more anchor carriers used by the user equipment to receive control signals transmitted from a base station; and making a request to the base station to change the anchor carrier set when it is determined that the anchor carrier set should be changed, wherein it is determined that the anchor carrier set should be changed when a reliability of a first carrier is greater than a reliability of a second carrier from a perspective of the user equipment, wherein the first carrier is currently not in the anchor carrier set and the second carrier is currently in the anchor carrier set, and wherein the act of making the request to the base station to change the anchor carrier set comprises:

making a determination as to whether the first carrier meets a predetermined minimum reliability threshold when it is determined that the anchor carrier set should be changed; and making a request to the base station to include multiple carriers into the anchor carrier set when it is determined that the first carrier does not meet the predetermined minimum reliability threshold, wherein the first carrier is included in the anchor carrier set after the change.

2. The method of claim 1,
wherein the user equipment is configured to communicate with the base station over a plurality of carriers with each carrier being associated with a bandwidth, and
wherein there is at least one gap in a frequency spectrum represented by the plurality of carriers.

3. The method of claim 1, wherein the first carrier is determined to be more reliable than the second carrier when any one or more of the following is true:
a signal-to-interference ratio (SIR) of the first carrier is higher than a SIR of the second carrier,
a reference signal received power (RSRP) of the first carrier is higher than a RSRP of the second carrier,
a data transmission rate of the first carrier is greater than a data transmission rate of the second carrier,
an error rate of the first carrier is lower than an error rate of the second carrier, and
a repeat request rate of the first carrier is lower than a repeat request rate of the second carrier.

4. The method of claim 1, wherein the act of making the request to the base station to change the anchor carrier set further comprises making a request to the base station to include only the first carrier in the anchor carrier set when it is determined that the first carrier meets the predetermined minimum reliability threshold.

5. The method of claim 1, wherein the multiple carriers are chosen from the plurality of carriers that the user equipment is configured to listen to so as to minimize a number of anchor carriers necessary to meet the predetermined minimum reliability threshold.

6. The method of claim 4,
wherein the base station is a current serving base station, and
wherein the act of making the request to the base station to include only the first carrier in the anchor carrier set comprises:
making a determination whether a handoff to a new serving base station is required when it is determined that the first carrier meets the predetermined minimum reliability threshold;
making a request to the current serving base station for the handoff when it is determined that the handoff is required; and
making a request to the new serving base station to include only the first carrier in the anchor carrier set after the handoff is requested.

7. The method of claim 1, further comprising putting receivers of the user equipment configured to receive signals on carriers not in the anchor carrier set into a power conservation mode.

8. The method of claim 7, wherein putting each of the receivers in the conservation mode includes any one or more of turning off the receiver, enabling a DRX mode for the receiver, and narrowing a receiving frequency range of the receiver to exclude the non-anchor carriers.

9. The method of claim 1, further comprising:
receiving an anchor hopping pattern from the base station; and
adapting one or more receivers of the user equipment to receive control signals transmitted from the base station according to the anchor hopping pattern,
wherein the anchor hopping pattern specifies a sequence over time of one or more anchor carriers used by the user equipment to receive the control signals transmitted by the base station.

10. The method of claim 9, further comprising:
making a request to the base station for the anchor hopping pattern when it is determined that the user equipment is moving at a rate that is at or greater than a predetermined minimum speed threshold.

11. The method of claim 1, wherein a number of anchor carriers in the anchor carrier set is changed after making the request.

12. A user equipment of a wireless network comprising:
a communications unit configured to communicate with a base station; and
a processing unit configured to:
make a determination as to whether an anchor carrier set should be changed, wherein the anchor carrier set includes one or more anchor carriers used by the user equipment to receive control signals transmitted from a base station; and
make a request to the base station, via the communications unit, to change the anchor carrier set when it determines that the anchor carrier set should be changed,
determine that the anchor carrier set should be changed when a reliability of a first carrier is greater than a reliability of a second carrier,
wherein the first carrier is currently not in the anchor carrier set and the second carrier is currently in the anchor carrier set,
wherein the processing unit is configured to request the change to the anchor carrier set by:
making a determination as to whether the first carrier meets a predetermined minimum reliability threshold when it determines that the anchor carrier set should be changed; and
making a request to the base station to include multiple carriers into the anchor carrier set when it determines that the first carrier does not meet the predetermined minimum reliability threshold, and
wherein the first carrier is included in the anchor carrier set after the change.

13. The user equipment of claim 12,
wherein the communications unit is configured to communicate with the base station over a plurality of carriers with each carrier being associated with a bandwidth, and
wherein there is at least one gap in a frequency spectrum represented by the plurality of carriers.

14. The user equipment of claim 12, wherein the processing unit is configured to determine that the first carrier is more reliable than the second carrier when any one or more of the following is true:
a signal-to-interference ratio (SIR) of the first carrier is higher than a SIR of the second carrier,
a reference signal received power (RSRP) of the first carrier is higher than a RSRP of the second carrier,
a data transmission rate of the first carrier is greater than a data transmission rate of the second carrier,
an error rate of the first carrier is lower than an error rate of the second carrier, and
a repeat request rate of the first carrier is lower than a repeat request rate of the second carrier.

15. The user equipment of claim 12, wherein the processing unit is further configured to request the change to the anchor carrier set by making a request to the base station to include only the first carrier in the anchor carrier set when it makes the determination that the first carrier meets the predetermined minimum reliability threshold.

16. The user equipment of claim 12, wherein the multiple carriers are chosen from the plurality of carriers the communications unit is configured to listen to so as to minimize a number of anchor carriers necessary to meet the predetermined minimum reliability threshold.

17. The user equipment of claim 15,
wherein the base station is a current serving base station, and
wherein the processing unit is configured to:
make a determination whether a handoff to a new serving base station is required when it determines that the first carrier meets the predetermined minimum reliability threshold;
make a request to the current serving base station for the handoff when it determines that the handoff is required; and
make a request to the new serving base station to include only the first carrier in the anchor carrier set after the handoff is requested.

18. The user equipment of claim 12, wherein the processing unit is configured to put receivers of the communications unit configured to receive signals on carriers not in the anchor carrier set into a power conservation mode.

19. The user equipment of claim 18, wherein putting each of the receivers in the conservation mode includes any one or more of turning off the receiver, enabling a DRX mode for the receiver, and narrowing a receiving frequency range of the receiver to exclude the non-anchor carriers.

20. The user equipment of claim 12, wherein the communication unit includes:
two or more fixed bandwidth receivers with each receiver configured to receive signals on corresponding carriers transmitted by the base station,
one or more adaptive bandwidth receivers with each receiver configured to be dynamically adaptable to receive signals on one or more carriers transmitted by the base station, or
one or more fixed bandwidth receivers and one or more adaptive bandwidth receivers.

21. The user equipment of claim 12, wherein the processing unit is configured to:
receive, via the communications unit, an anchor hopping pattern from the base station, and
adapt one or more receivers of the communications unit to receive the control signals transmitted from the base station according to the anchor hopping pattern,
wherein the anchor hopping pattern specifies a sequence over time of one or more anchor carriers used by the user equipment to receive the control signals transmitted by the base station.

22. The user equipment of claim 21, further comprising:
a location detection unit configured to determine a location of the user equipment, wherein
the processing unit is configured to:
make a determination, via the location detection unit, that the user equipment is moving at a predetermined minimum speed threshold or greater; and
make a request to the base station, via the communications unit, for the anchor hopping pattern when it determines that the user equipment is moving at the predetermined minimum speed threshold or greater.

23. A method for operating a user equipment of a wireless network, comprising:
making a determination as to whether an anchor carrier set should be changed, wherein the anchor carrier set includes one or more anchor carriers used by the user equipment to receive control signals transmitted from a base station;
making a request to the base station to change the anchor carrier set when it is determined that the anchor carrier set should be changed;
receiving an anchor hopping pattern from the base station;
adapting one or more receivers of the user equipment to receive control signals transmitted from the base station according to the anchor hopping pattern,
wherein the anchor hopping pattern specifies a sequence over time of one or more anchor carriers used by the user equipment to receive the control signals transmitted by the base station; and
making a request to the base station for the anchor hopping pattern when it is determined that the user equipment is moving at a rate that is at or greater than a predetermined minimum speed threshold.

24. A user equipment of a wireless network comprising:
a communications unit configured to communicate with a base station; and
a processing unit configured to:
make a determination as to whether an anchor carrier set should be changed, wherein the anchor carrier set includes one or more anchor carriers used by the user equipment to receive control signals transmitted from a base station; and
make a request to the base station, via the communications unit, to change the anchor carrier set when it determines that the anchor carrier set should be changed,
receive, via the communications unit, an anchor hopping pattern from the base station,
adapt one or more receivers of the communications unit to receive the control signals transmitted from the base station according to the anchor hopping pattern,
wherein the anchor hopping pattern specifies a sequence over time of one or more anchor carriers used by the user equipment to receive the control signals transmitted by the base station,
a location detection unit configured to determine a location of the user equipment,
wherein the processing unit is configured to:
make a determination, via the location detection unit, that the user equipment is moving at a predetermined minimum speed threshold or greater; and
make a request to the base station, via the communications unit, for the anchor hopping pattern when it determines that the user equipment is moving at the predetermined minimum speed threshold or greater.

25. A method for operating a base station of a wireless network, comprising:
making a determination as to whether anchor carrier sets should be updated for one or more user equipments, wherein each anchor carrier set includes one or more anchor carriers used by the base station to transmit control signals to the one or more user equipments;
transmitting to the one or more user equipments a notification of the anchor carrier set update when it is determined that the anchor carrier sets should be updated;
making a determination as to whether an anchor hopping pattern is needed for a user equipment;
providing the anchor hopping pattern to the user equipment when it is determined that the anchor hopping pattern is needed; and
transmitting control signals to the user equipment according to the anchor hopping pattern, wherein the anchor hopping pattern specifies a sequence over time of one or more anchor carriers used by the base station to transmit the control signals to the user equipment, and wherein it is determined that the anchor hopping pattern is needed when:
- it is determined that a user equipment is moving at a rate that is at or greater than a predetermined minimum speed threshold, or
- a request for the anchor hopping pattern is received from the user equipment.

26. A base station of a wireless network, comprising:
a communications unit configured to communicate with the user equipment; and
a processing unit configured to:
- make a determination as to whether anchor carrier sets should be updated for one or more user equipments, wherein each anchor carrier set includes one or more anchor carriers used by the base station to transmit control signals to the one or more user equipments;
- transmit to the one or more user equipments, via the communications unit, a notification of the anchor carrier set update when it determines that the anchor carrier sets should be updated;
- make a determination as to whether an anchor hopping pattern is needed for a user equipment;
- provide the anchor hopping pattern to the user equipment, via the communications unit, when it is determined that the anchor hopping pattern is needed; and
- transmit control signals to the user equipment, via the communications unit, according to the anchor hopping pattern, wherein the anchor hopping pattern specifies a sequence over time of one or more anchor carriers used by the base station to transmit the control signals to the user equipment, wherein the processing unit is configured to determine that the anchor hopping pattern is needed when:
- the processing unit determines that a user equipment is moving at a rate that is at or greater than a predetermined minimum speed threshold, or
- a request for the anchor hopping pattern is received from the user equipment.

* * * * *

UNITED STATES PATENT AND TRADEMARK OFFICE
CERTIFICATE OF CORRECTION

| | | |
|---|---|---|
| PATENT NO. | : 8,699,467 B2 | Page 1 of 1 |
| APPLICATION NO. | : 12/934427 | |
| DATED | : April 15, 2014 | |
| INVENTOR(S) | : Lindoff et al. | |

It is certified that error appears in the above-identified patent and that said Letters Patent is hereby corrected as shown below:

In the Specification

In Column 9, Line 10, delete "base station 920" and insert -- base station 910 --, therefor.

In Column 9, Line 11, delete "user equipment 910" and insert -- user equipment 920 --, therefor.

Signed and Sealed this
Twenty-eighth Day of October, 2014

Michelle K. Lee
*Deputy Director of the United States Patent and Trademark Office*